US005391628A

United States Patent [19]

Gaillard et al.

[11] Patent Number: 5,391,628

[45] Date of Patent: Feb. 21, 1995

[54] FUNCTIONALIZED MULTIBLOCK MACROMONOMERS AND PROCESS FOR THEIR PRODUCTION

[75] Inventors: Patrice Gaillard, Souchez; Yves Barbier, Pont Point, both of France; Sunil K. Varshney, Verdun, Canada; Philippe Teyssie, Neuville en Condroz, Belgium; Christian Jacobs, Hognoul, Belgium; Roger Fayt, Neuville en Condroz, Belgium

[73] Assignee: Elf Atochem S.A., Paris, France

[21] Appl. No.: 916,875

[22] PCT Filed: Feb. 14, 1991

[86] PCT No.: PCT/FR91/00110

§ 371 Date: Sep. 3, 1992

§ 102(e) Date: Sep. 3, 1992

[87] PCT Pub. No.: WO91/12284

PCT Pub. Date: Aug. 22, 1991

[30] Foreign Application Priority Data

Feb. 14, 1990 [FR] France ................................ 90 01724

[51] Int. Cl.[6] .................... C08F 297/02; C08F 299/00

[52] U.S. Cl. .................................... 525/250; 525/271; 525/299

[58] Field of Search ......................... 525/250, 271, 299

[56] References Cited

U.S. PATENT DOCUMENTS

| | | | |
|---|---|---|---|
| 3,687,978 | 8/1972 | Pedersen | 549/349 |
| 3,786,116 | 1/1974 | Milkovich et al. | 525/276 |
| 3,842,059 | 10/1974 | Milkovich et al. | 525/292 |
| 3,842,146 | 10/1974 | Milkovich et al. | 525/271 |
| 4,567,239 | 1/1986 | Mancinelli | 525/309 |
| 4,636,540 | 1/1987 | Warfel | 523/310 |
| 4,722,976 | 2/1988 | Ceska | 525/301 |
| 4,767,824 | 8/1988 | Ouhadi et al. | 525/343 |
| 4,826,941 | 5/1989 | Teyssie et al. | 526/173 |
| 4,845,156 | 7/1989 | Cohen | 525/259 |

FOREIGN PATENT DOCUMENTS

| | | |
|---|---|---|
| 0104046 | 3/1984 | European Pat. Off. . |
| 62/232408 | 4/1986 | Japan . |

OTHER PUBLICATIONS

Fyat, R., et al., Macromolecules 1987, 29, 1442.

Teyssie, P., et al. Polymer Preprints, ACS, 1988; 29 (2), 57.

Katherine Antolin, et al., Polymer, 1990, vol. 31, May (List continued on next page.)

*Primary Examiner*—James J. Seidleck
*Assistant Examiner*—I. Zemel
*Attorney, Agent, or Firm*—Finnegan, Henderson, Farabow, Garrett & Dunner

[57] ABSTRACT

The application discloses a functionalized multiblock macromonomer of formula:

$$(A)_m(B)_n(C)_p F \quad (I)$$

or of formula:

$$F(A)_m(B)_n(C)_p F \quad (II)$$

in which formulae:

each of the blocks A, B and C represents a sequence of a monomer chosen from the acrylic, vinylaromatic, methacrylic, diene, vinylpyridine, vinylpyrrolidone, alkylene oxide, lactam, lactone and maleimide monomer classes, on condition that at least one of the blocks A and C is chosen from a different class to that of block B and that at least one of the blocks A, B or C is a (meth)acrylic sequence, m, n and p are integers representing the number of monomer units in the sequence under consideration, such that $3 \leq n \leq 1000$, $0 \leq m \leq 1000$ and $0 \leq p \leq 1000$, on condition that m and p are not 0 at the same time, and F is a group terminated by $O^-$, by OH, by an α,β-ethylenic unsaturation, or by an oxirane groups.

Also disclosed are processes for preparing the functionalized multiblock macromonomer which macromonomer combines the advantages of multiblock polymers containing acrylic sequences with the reactivity of macromonomers.

13 Claims, No Drawings

OTHER PUBLICATIONS

'96, "Synthesis of poly(t-butyl acrylate) macromonomers".

Varshney, Sunil K., et al., "Anionic Polymerization of Acrylic Monomers (VII) Synthesis and Characterization of (Meth)acrylic End-functionalized Polymers": Macromonomers and Telechelics, Laboratory of Macromolecular Chemistry and Organic Catalysis, University of Liége (BELGIUM).

DePorter et al., Polymer Preprints 29, No. 1, pp. 343-345 (Jun. 1988).

Lutz et al., Polymer Bulletin, vol. 12, pp. 79-85 (1984).

Smith, Polymer Preprints, vol. 29, No. 2, pp. 48-49 (1988).

DATABASE WPIL, No. 88-336121, Derwent Pub. Ltd., Londres, GB; & Research Disclosure 2904077 *Abstract*.

DATABASE WPIL, No. 89-27856, Derwent Pub. Ltd., Londres, GB & JP-A-63301281 (Sekisui Chem.) *Abstract*.

DATABASE WPIL, No. 85-227892, Derwent Pub. Ltd., Londres, GB & Research Disclosure 256024 (Anonymous) Oct. 8, 1985 *Abstract*.

Chemical Abstracts, vol. 97, No. 12, Sept. 1982, p. 22, abstract No. 93047m Columbus, Ohio, US; & CA-A-1 123 537 (CPC International Inc.) *Abstract*.

FUNCTIONALIZED MULTIBLOCK MACROMONOMERS AND PROCESS FOR THEIR PRODUCTION

The present invention relates to functionalized multiblock macromonomers containing at least one (meth)acrylic sequence, and to a process for their production.

Triblock copolymers combining alkyl methacrylate blocks of different types are already known. Thus, Polymer Preprints 29(1), pages 343–345, describes triblock copolymers (tert-butyl methacrylate-b-2-ethylhexyl methacrylate-b-tert-butyl methacrylate) obtained by anionic polymerization in tetrahydrofuran at −78° C. in the presence of a difunctional initiator. Block copolymers which are able to contain up to 20% by weight of tert-butyl methacrylate but which have a relatively wide molecular weight distribution are obtained by this method. On the other hand, the combination of various methacrylates in a triblock copolymer of this type does not appear to be able to confer on this copolymer, even after subsequent hydrolysis and/or neutralization of the ester groups, properties which render it suitable for a particular application. On the other hand, the combination, in a triblock copolymer, of acrylate blocks and methacrylate or vinylaromatic blocks appears capable, provided that the copolymer has a narrow molecular weight distribution, of providing properties of value in several types of application.

Moreover, it is known that a living polymer obtained by an anionic method is able to react with a terminating agent such as a halogenated compound and that, in order to avoid undesirable side reactions, this termination reaction may be preceded by a reaction with a lower alkylene oxide or sulfide. When the terminating agent itself contains an alpha-beta ethylenic unsaturation or another polymerizable group, the resulting polymer is. known under the name macromonomer. Examples of such macromonomers have been described in particular in the following patents: U.S. Pat. No. 3,786,116, 3,842,059, EP-A-104 046 and U.S. Pat. No. 4,567,239. Poly(alkyl methacrylate) macromonomers endowed with a styrene or methacrylate ester group at one end of the chain have been described by P. Lutz et al., Poly. Bull. 12, 79 (1984). S. D. Smith, in Polymer Preprints Vol 29, no. 2, 1988, No. 3776, pages 48 and 49, describes methyl methacrylate macromonomers endowed at one end of the chain with a vinyl group (following the use, as terminating agent, of 4-vinylbenzoyl chloride), or with an O− anion (following the use, as terminating agent, of benzaldehyde), with the possibility of then reacting this anion with reagents such as methacryloyl chloride and chloromethylstyrene, or of obtaining macromonomers containing a hydroxyl functional group. Finally, Patent Application JP-A-62/232 408 describes the preparation of butyl acrylate macromonomers having acarboxyl terminal group by polymerization in the presence of 3-mercaptopropionic acid. By reacting the carboxyl terminal group with glycidyl methacrylate, a butyl acrylate macromonomer having a terminal methacryloyloxy group is obtained, the polydispersity index of which is about 1.8. If a 2-mercaptoethanol is used in the first step, a polymer having a hydroxyl terminal group is obtained.

The present invention provides a process which makes it possible to combine the potential advantages of multiblock polymers containing acrylic sequences with the reactivity possibilities of the macromonomers, that is to say a process for the preparation of functionalized multiblock macromonomers.

The present invention therefore firstly relates to a functionalized multiblock macromonomer of formula:

$$(A)_m(B)_n(C)_pF \quad (I)$$

or of formula:

$$F(A)_m(B)_n(C)_pF \quad (II)$$

in which formulae:

- each of the blocks A, B and C represents a sequence of a monomer chosen from the acrylic, vinylaromatic, methacrylic, diene, vinylpyridine, vinylpyrrolidone, alkylene oxide, lactam, lactone and maleimide monomer classes, on condition that at least one of the blocks A and C is chosen from a different class to that of block B and that at least one of the blocks A, B or C is a (meth)acrylic sequence,
- m, n and p are integers representing the number of monomer units in the sequence under consideration, such that $3 \leq n \leq 1000$, $0 \leq m \leq 1000$ and $0 \leq p \leq 1000$, on condition that m and p are not 0 at the same time, and
- F is a group terminated by O−, OH, an α,β-ethylenic unsaturation or an oxirane group.

Preferably, the functionalized multiblock macromonomer according to the invention is such that the multiblock polymer $(A)_m(B)_n(C)_p$ has a number-average molecular weight ranging from 5000 to 300,000 approximately and/or a polydispersity of the molecular weights ranging from 1.05 to 2.0 approximately.

An acrylic monomer is a monomer chosen from primary, secondary or tertiary alkyl acrylates in which the alkyl group, which if necessary is substituted, for example by at least one halogen atom, such as chlorine or fluorine, and/or at least one hydroxyl group, contains from 1 to 18 carbon atoms, mentioning more particularly ethyl acrylate, propyl acrylate, isopropyl acrylate, butyl acrylate, isobutyl acrylate, hexyl acrylate, tert-butyl acrylate, 2-ethylhexyl acrylate, nonyl acrylate, lauryl acrylate, stearyl acrylate, cyclohexyl acrylate and isodecyl acrylate, and also phenyl acrylate, isobornyl acrylate, alkylthioalkyl or alkoxyalkyl acrylates, acrylonitrile and dialkylacrylamides.

A methacrylic monomer is a monomer chosen from alkyl methacrylates in which the alkyl radical, which if necessary is substituted, for example by at least one halogen atom, such as chlorine or fluorine, and/or at least one hydroxyl group, contains 1 to 18 carbon atoms, such as methyl methacrylate, ethyl methacrylate, 2,2,2-trifluoroethyl methacrylate, n-propyl methacrylate, isopropyl methacrylate, n-butyl methacrylate, sec-butyl methacrylate, tert-butyl methacrylate, n-amyl methacrylate, i-amyl methacrylate, hexyl methacrylate, 2-ethylhexyl methacrylate, cyclohexyl methacrylate, octyl methacrylate, i-octyl methacrylate, decyl methacrylate, β-hydroxyethyl methacrylate, hydroxypropyl methacrylate and hydroxybutyl methacrylate as well as glycidyl methacrylate, norbornyl methacrylate, methacrylonitrile and dialkylmethacrylamides.

A vinylaromatic monomer is an aromatic monomer containing an ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

A diene monomer is a diene chosen from conjugated or nonconjugated straight-chain or cyclic dienes, such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2.2.21octa-2,5-diene, cyclopentadiene, 4,7,8,9-tetrahydroindene and isopropylidenetetrahydroindene.

Alkylene oxides are, in particular, ethylene oxide and propylene oxide. Lactams and lactones are in particular caprolactam and caprolactone. Maleimides are, more particularly, the N-substituted maleimides of formula:

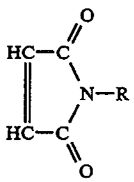

in which R is an alkyl, arylalkyl, aryl or alkylaryl radical having from 1 to 12 carbon atoms. Examples of such molecules are, in particular, N-ethylmaleimide, N-isopropylmaleimide, N-n-butylmaleimide, N-isobutylmaleimide, N-tert-butylmaleimide, N-n-octylmaleimide, N-cyclohexylmaleimide, N-benzylmaleimide and N-phenylmaleimide.

Thus, the macromonomers according to the invention may be diblock when one of the integers m and p is 0. Among such diblock macromonomers the following families are found in particular:

vinylaromatic-b-acrylic,
vinylaromatic-b-methacrylic,
acrylic-b-methacrylic,
diene-b-acrylic,
diene-b-methacrylic,
vinylpyridine-b-acrylic,
vinylpyridine-b-methacrylic,
acrylic-b-maleimide,
methacrylic-b-maleimide, and
tert-butyl methacrylate-b-alkylene oxide.

The macromonomers according to the invention may also be triblock when neither of the integers m and p is 0. Among such triblock macromonomers, the following families are found in particular:

methacrylic-b-acrylic-b-methacrylic,
acrylic-b-vinylaromatic-b-acrylic,
methacrylic-b-vinylaromatic-b-methacrylic,
(meth)acrylic-b-diene-(meth)acrylic,
vinylaromatic-b-acrylic-b-methacrylic,
diene-b-acrylic-b-methacrylic,
vinylaromatic-b-methacrylic-b-acrylic,
maleimide-b- (meth) acrylic-b-maleimide, and
acrylic-b-methacrylic-b-acrylic.

When blocks A and C are of identical type, they may consist of the same number of recurring units of the monomer under consideration, particularly when they are prepared by the process designated below as the "second process". In this latter case, the central block B may commonly represent from 10 to 99% approximately by weight of the macromonomer.

According to a variant of the present invention, the blocks representing an acrylic and/or methacrylic monomer sequence, as defined above, may be hydrolyzed to a corresponding acrylic and/or methacrylic acid sequence and the said sequence may, if necessary, subsequently be saponified to a corresponding alkali metal acrylate and/or methacrylate Sequence. According to another variant of the present invention, the blocks representing an acrylic and/or methacrylic monomer sequence, as defined above, may be transesterified to another acrylic and/or methacrylic monomer sequence, for example so as to replace a tertiary or secondary acrylate by a primary acrylate.

The multiblock macromonomers of formula (I) may be obtained by a first process, characterized in that:

(1) an anionic polymerization of at least one monomer A is carried out with the aid of an initiator system consisting of at least one monofunctional initiator and at least one ligand chosen from alkali metal salts or alkaline earth metal salts and macrocyclic complexing agents which do not contain nitrogen, to obtain a living chain of the polymer sequence $(A)_m^-$; then (2) the living chain thus obtained is reacted with at least one monomer B, in the presence of at least one ligand as defined above, to obtain a living diblock copolymer $(A)_m(B)_n^-$, then, if necessary, (3) the living diblock copolymer thus obtained is reacted with at least one monomer C, in the presence of at least one ligand as defined above, to obtain a living triblock copolymer $(A)_m(B)_n(C)_p^-$, then (4) the living block polymer obtained in step (2) or in step (3) is reacted with a functionalizing agent in order to obtain a multiblock macromonomer having a terminal vinyl or $O^-$ or an oxirane group, (5) if necessary, in the case where the multiblock macromonomer obtained in step (4) has a terminal $O^-$, it is reacted with a second functionalizing agent in order to obtain a multiblock macromonomer having a terminal hydroxyl or vinyl, and (6) if necessary, in the case where the multiblock macromonomer obtained in step (5) has a terminal vinyl, it is subjected to a transesterification of its acrylic groups or to a hydrolysis followed, if necessary, by a saponification.

The monofunctional initiator used in the first step of the process may be chosen, in particular, from the compounds of formula:

$$(R)_p\text{—}M$$

in which:

M denotes an alkali metal or alkaline earth metal (valency p of 1 or 2); and

R denotes a straight-chain or branched alkyl radical containing 2 to 6 carbon atoms, or an optionally substituted alkyl radical, or an alkyl radical containing 1 to 6 carbon atoms and substituted by at least one phenyl group;

and the compounds of formula:

$$(C_6H_5)_2CHM'$$

in which M' is chosen from lithium, sodium and potassium.

Monofunctional initiators of this type are, for example, sec-butyllithium, n-butyllithium, fluorenyllithium, alpha-methylstyryllithium, 1,1-diphenylhexyllithium (DPHLi), diphenylmethyllithium, diphenylmethylsodium or diphenylmethylpotassium and 1,1-diphenyl-3-methylpentyllithium.

The ligand may be chosen from, on the one hand, inorganic salts of alkali metals or alkaline earth metals, for example the chlorides, fluorides, bromides, iodides, borides, sulfates, nitrates and borates, and, on the other hand, the organic salts of alkali metals, for example alcoholates, esters of carboxylic acid substituted in the alpha-position by the said metal and compounds in which the said alkali metal is combined with a group such as:

(A) the groups of formula:

$$O-\underset{\underset{O}{\|}}{C}-R_1 \qquad (II)$$

in which $R_1$ is a straight-chain or branched alkyl radical having from 1 to 20 carbon atoms, or a cycloalkyl radical having from 3 to 20 carbon atoms, or an aryl radical having from 6 to 14 carbon atoms, (B) the groups of formula:

$$O-\underset{\underset{O}{\|}}{C}\text{+}CYZ\text{+}_{n}CH_mX_{3-m} \qquad (III)$$

in which:

- Y and Z, which may be identical or different from one another, are chosen from a hydrogen atom and halogen atoms;
- n is an integer ranging from 0 to 4,
- X is a halogen atom, and
- m is an integer ranging from 0 to 2, (C) the groups of formula:

$$O-SO_2-CT_3 \qquad (IV)$$

in which T is chosen from a hydrogen atom and halogen atoms, and (D) the groups of formula:

$$B(R_2)_4 \qquad (V)$$

in which $R_2$ is chosen from a hydrogen atom and alkyl and aryl radicals.

Examples of groups of formula (II) are acetate, propionate and benzoate groups. Examples of groups of formula (III) are $\alpha$-bromoacetate and trifluoroacetate group. Examples of groups of formula (IV) are trifluormethanesulfonic and methanesulfonic groups. Examples of groups (V) are borohydride and tetraphenylboride groups.

The ligand may also consist of a macrocyclic complexing agent which does not contain nitrogen, chosen in particular from cyclic polyethers (also termed crown ethers) and cyclic polythioethers, such as, in particular, macrocyclic polyethers in which the macrocyclic ring contains at least 14 carbon and oxygen atoms, each oxygen atom in the ring being separated from the other oxygen atoms of the ring by two or three carbon atoms; macrocyclic polyethers of this type have already been described in the patents U.S. Pat. Nos. 3,687,978 and 4 826 941, the contents of which are incorporated here by reference.

In the first step of the process according to the invention, the proportion of ligand used may vary substantially with respect to the initiator. This amount may be, for example, a large excess with respect to the molar amount of initiating agent. This amount may also be equal to or less than the molar amount of initiating agent. Preferably, the ligand is introduced in a molar proportion with respect to the initiator of at least 0.3 and ranging up to 50 approximately. In steps (1) to (3) of the process according to the invention, the polymerization takes place in the absence of moisture and oxygen and in the presence of at least one solvent, chosen, preferably, from aromatic solvents, such as benzene and toluene, or tetrahydrofuran, diglyme, tetraglyme, orthoterphenyl, biphenyl, decalin, tetralin or dimethylformamide.

With regard to the polymerization temperature, this may vary between about $-78°$ C. and $20°$ C. and may even reach $60°$ C. if the ligand is an alkali metal alcoholate.

Step (4) of the process according to the invention is preferably carried out in the same reaction mixture as steps (1) to (3), at a temperature of between about $-78°$ C. and $+20°$ C. depending on the nature of the carbanion to be functionalized, with a molar ratio of functionalizing agent to initiator of generally between about 1 and 10 and for a period of generally between 10 minutes and 3 hours approximately. In said step (4), the functionalizing agent used may be a vinyl monohalide, such as vinyl bromide, allyl bromide, allyl chloride, vinyl chloride, p-vinylbenzyl halides, methacryloyl chloride or 4-vinylbenzoyl chloride, and chlorosilanes, for example chlorodimethylsilylpropyl methacrylate, 4-(chlorodimethylsilyl)styrene, 4-(dichloromethylsilyl)styrene, 4-(chlorodimethylsilyl)-alpha-methylstyrene, 4-(trichlorosilyl)styrene, 4-(trichlorosilyl)-alphamethylstyrene and 4-(chlorodimethylsilyl)-alphamethylstyrene.

In order to obtain a multiblock macromonomer terminated by an oxirane group, a compound such as epichlorohydrin is preferably used as functionalizing agent in step (4).

It is also possible to use, as functionalizing agent, an aldehyde of formula:

$$R_1-C\begin{matrix}\nearrow O \\ \searrow H\end{matrix},$$

in which $R_1$ represents a substituted or unsubstituted, preferably aromatic, hydrocarbon group, which leads to a macromonomer of formula:

$$(A)_m(B)_n(C)_p-\underset{\underset{H}{|}}{\overset{\overset{R_1}{|}}{C}}-O^-M^+$$

M representing the metal of the initiator, and the terminal OM being converted, in step (5), into terminal OH by deactivation by means of a protonic agent, such as water or an alcohol, or, by reaction with a halide HalF′, F′ containing a terminal vinyl group, into terminal O-F′.

Aldehydes which may be mentioned are benzaldehyde and anthracenylaldehyde and halides HalF' which may be mentioned are all acid chlorides, for example methacryloyl chloride or acryloyl chloride.

The macromonomer obtained at the end of step (4) or of step (5) may be separated off from the mixture by precipitation in a solvent or mixture of solvents such as methanol, a mixture of methanol and water, heptane, and the like. The macromonomer separated off may then be purified by a technique such as that described in the patent U.S. Pat. No. 4,636,540.

The multiblock macromonomers according to the invention may, during step (6), be hydrolyzed at a temperature ranging from 70° to 170° C. approximately, under a pressure ranging from 1 to 15 bars and in the presence of 0.5 to 10% approximately by weight, with respect to the macromonomer, of an acid catalyst such as para-toluenesulfonic acid, methanetoluenesulfonic acid or hydrochloric acid, in a solvent such as dioxane, toluene, tetrahydrofuran, diglyme, dimethyl isobutyl ketone or a mixture of solvents enabling the reaction to be carried out in homogeneous phase. After hydrolysis, the macromonomers may be precipitated from heptane, filtered off, washed in order to remove all traces of catalyst and finally dried. They may also subsequently be neutralized using methanolic potassium hydroxide solution or tetramethylammonium hydroxide in solution in a mixture of toluene and methanol in order to form the corresponding polyelectrolyte macroionomers or macromonomers.

When the macromonomers according to the invention contain a sequence derived from a tertiary or secondary alkyl acrylate, this sequence may also be transesterified in a known manner to give a primary alkyl acrylate sequence.

The multiblock macromonomers of formula (II) may be obtained by a second process, characterized in that (1) the anionic polymerization of at least one monomer B is carried out with the aid of an initiator system consisting of at least one difunctional initiator and at least one ligand chosen from alkali metal or alkaline earth metal salts and macrocyclic complexing agents which do not contain nitrogen, to obtain a living polymer $-(B)_n-$, then (2) the living polymer is reacted with at least one monomer A, in the presence of at least one ligand as defined above, to obtain a living triblock copolymer $-(A)_m(B)_n(A)_p-$, then (3) the living triblock copolymer is reacted with at least one functionalizing agent in order to obtain a triblock macromonomer having two terminal vinyl or $O^-$ or an oxirane group, (4) if necessary, in the case where the triblock macromonomer obtained in step (3) has a terminal $O^-$, it is reacted with a second functionalizing agent in order to obtain a triblock macromonomer having at least one terminal hydroxyl or vinyl, and (5) if necessary, in the case where the triblock macromonomer obtained in step (4) has a terminal vinyl, it is subjected to a transesterification of its acrylic groups or to a hydrolysis followed, if necessary, by a saponification.

The difunctional initiator used in the first step of the process may be chosen, in particular, from compounds such as 1,4-dilithio-1,1,4,4-tetraphenylbutane, 1,4-disodio-1,1,4,4-tetraphenylbutane, naphthalenesodium, naphthalenelithium and naphthalenepotassium and their homologs. The nature and the proportion of the ligand, the polymerization conditions for steps (1) and (2), the nature and the proportion of the functionalizing agent and the reaction conditions used in step (3) are the same as those described with reference to step (4) of the first process above. When an aldehyde is used as functionalizing agent, a triblock monomer of formula:

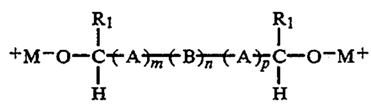

is obtained, M representing the metal of the initiator, the terminal OM being converted, in step (4), into terminal OH by deactivation by a protonic agent, such as water or an alcohol, or, by reaction with a halide HalF', F' containing a terminal vinyl group, into terminal O-F'.

The hydrolysis, the neutralization and the transesterification of the triblock macromonomers during step (5) are carried out under the same conditions as those described above with reference to step (6) of the first process.

The degree of functionalization during step (4) of the first process or (3) of the second process is highly dependent on the purity of the functionalizing agent, the reaction time and the temperature. It is determined by a proton nuclear magnetic resonance method.

The following examples illustrate the present invention without restricting its scope.

EXAMPLE 1

7.5 g of pre-dried lithium chloride are introduced into a pre-dried reactor which has a volume of 4 liters and is under a nitrogen atmosphere. 2000 $cm^3$ of purified tetrahydrofuran which has been kept in the absence of light and, with stirring, $17.7\times10^{-3}$ mol of sec-butyllithium are added. The mixture is brought to a temperature of −60° C. and 133 g of methyl acrylate and then, after 30 minutes, 44 g of tert-butyl acrylate are then added. The reaction is allowed to proceed for 15 minutes. The solvents and monomers are purified by the Customary anionic polymerization techniques; in particular, the acrylate and the methacrylate are treated successively with calcium hydride and triethylaluminum.

A diblock copolymer having the following characteristics:

| | |
|---|---|
| Mn (methacrylate) = | 9 000 |
| Mn (acrylate) = | 4 000 |
| Mw/Mn (total copolymer) = | 1.3 |

is thus obtained in a yield of 100%.

The living diblock copolymer obtained is then reacted with $5.3\times10^{-2}$ mol of benzaldehyde for 1 hour at −50° C. and then with $7.1\times10^{-2}$ mol of methacryloyl chloride. The macromonomer obtained is separated off from the mixture by precipitation in a mixture of equal weights of water and methanol. The degree of functionalization of the diblock macromonomer obtained, determined by proton nuclear magnetic resonance, is 75%.

EXAMPLE 2

The experimental procedure of Example 1 is repeated modifying the amounts of the ingredients as follows and introducing the tert-butyl acrylate solution before the methyl methacrylate solution.

| | |
|---|---|
| lithium chloride | 3.0 g |
| sec-butyllithium | $7.1 \times 10^{-3}$ mol |
| tert-butyl acrylate | 142 g |
| methyl methacrylate | 35 g |
| benzaldehyde | $2.1 \times 10^{-2}$ mol |
| methacryloyl chloride | $2.8 \times 10^{-2}$ mol |

Under these conditions a diblock macromonomer is obtained which has the following characteristics:

| | |
|---|---|
| Mn (acrylate) = | 34 000 |
| Mn (methacrylate) = | 8 000 |
| Mw/Mn (total copolymer) = | 1.35 |
| degree of functionalization = | 55% |

EXAMPLE 3

Using the experimental techniques of Example 1, carrying out the procedure in three steps (first step: methyl methacrylate for 30 minutes; second step: tert-butyl acrylate for 15 minutes; third step: methyl methacrylate for 30 minutes) and modifying the amounts of the ingredients as follows, a triblock macromonomer (methyl methacrylate—b—tert-butyl acrylate—b—methyl methacrylate) is prepared.

| | |
|---|---|
| lithium chloride | 2.9 g |
| sec-butyllithium | $7 \times 10^{-3}$ mol |
| methyl methacrylate | 35 g |
| tert-butyl acrylate | 105 g |
| benzaldehyde | $2.1 \times 10^{-2}$ mol |
| methacryloyl chloride | $2.8 \times 10^{-2}$ mol |

The triblock macromonomer obtained under these conditions has the following characteristics:

| | |
|---|---|
| Mn (methacrylate) = | 6 300 |
| Mn (acrylate) = | 21 000 |
| Mn (methacrylate) = | 9 500 |
| Mw/Mn (total copolymer) = | 1.42 |
| degree of functionalization = | 65% |

EXAMPLE 4

The experimental procedure of Example 2 is repeated, replacing the sec-butyllithium by naphthalenelithium and modifying the amounts of the ingredients as follows, in order to prepare a triblock macromonomer (methyl methacrylate b—tert-butyl acrylate—b—methyl methacrylate).

| | |
|---|---|
| lithium chloride | 7.4 g |
| lithium napththalene [sic] | $17.7 \times 10^{-3}$ mol |
| methyl methacrylate | 44 g |
| tert-butyl acrylate | 133 g |
| benzaldehyde | $5.3 \times 10^{-2}$ mol |
| methacryloyl chloride | $7.1 \times 10^{-2}$ mol |

The triblock macromonomer obtained has the following characteristics:

| | |
|---|---|
| Mn (acrylate) = | 22 300 |
| Mn (methacrylate) = | 12 200 |
| Mw/Mn (total copolymer) = | 1.48 |
| degree of functionalization = | 60% |

EXAMPLE 5

$2.5\times 10^{-3}$ mol of lithium chloride previously dried at 130° C. under vacuum are introduced into a predried reactor which has a volume of 250 ml and is under a nitrogen atmosphere. 20 ml of tetrahydrofuran dried over sodium and benzophenone and, with stirring, $0.5\times 10^{-3}$ mol of sec-butyllithium are added. The mixture is brought to a temperature of $-78°$ C. using a mixture of acetone and solid carbon dioxide and 1 g of styrene previously dried over calcium hydride and then fluorenyllithium and then, after 15 minutes, 1 g of tert-butyl acrylate (dried over calcium hydride and then triethylaluminum) diluted in 2 ml of tetrahydrofuran (dried over polystyryllithium) are then added. After polymerization for a further 15 minutes, a diblock copolymer having the following characteristics:

| | |
|---|---|
| Mn (styrene) = | 2 100 |
| Mn (acrylate) = | 4 200 |
| Mw/Mn (total copolymer) = | 1.24 |

is obtained in a yield of 100%.

The living diblock copolymer obtained is then reacted for 2 hours at $-78°$ C. with $10^{-3}$ mol of 4-vinylbenzoyl chloride previously purified by distillation. The degree of functionalization of the diblock macromonomer obtained, determined by proton nuclear magnetic resonance, using a BRUKER AN 400 spectrometer, is 100%.

EXAMPLE 6

The experimental procedure of Example 5 is repeated replacing the sec-butyllithium by naphthalenelithium and modifying the amounts of the ingredients as follows:

| | |
|---|---|
| lithium chloride | $5 \times 10^{-3}$ mol |
| tetrahydrofuran | 30 ml |
| napththalenelithium | $10^{-3}$ mol |
| styrene | 1 g |
| tert-butyl acrylate | 2 g (in 4 ml of tetrahydro-furan) |
| 4-vinylbenzoyl chloride | $2 \times 10^{-3}$ mol |

The triblock macromonomer obtained under these conditions has the following characteristics:

| | |
|---|---|
| Mn (styrene) = | 2 200 |
| Mn (acrylate) = | 6 800 |
| Mw/Mn (total copolymer) = | 1.3 |
| degree of functionalization = | 100% |

EXAMPLE 7

Using the experimental techniques of Example 5, carrying out the reaction in three steps (the final step being polymerization of 1 g of methyl methacrylate for 15 minutes) and modifying the amount of tetrahydrofuran (30 ml), a triblock macromonomer (styrene—b—tert-butyl acrylate—b—methyl methacrylate) is obtained which has the following characteristics:

| | |
|---|---|
| Mn (styrene) = | 2 100 |
| Mn (acrylate) = | 4 300 |
| Mn (methacrylate) = | 6 500 |

-continued

| | |
|---|---|
| Mw/Mn (total copolymer) = | 1.3 |
| degree of functionalization = | 100% |

EXAMPLE 8

The styrene-b-tert-butyl acrylate diblock copolymer obtained in Example 5 is reacted for 4 hours at −78° C. with $10^{-3}$ mol of 4-(chlorodimethylsilyl)-alphamethylstyrene. The degree of functionalization of the diblock macromonomer obtained, determined as in Example 5, is 67%.

EXAMPLE 9

The experimental procedure of Example 5 is repeated replacing styrene by methyl methacrylate with a view to obtaining a diblock copolymer having the following characteristics:

| | |
|---|---|
| Mn (methacrylate) = | 2 500 |
| Mn (acrylate) = | 2 300 |
| Mw/Mn (total copolymer) = | 1.2 |

This copolymer is reacted for 4 hours at −78° C. with $10^{-3}$ mol of 4-(chlorodimethylsilyl)-alphamethylstyrene. The degree of functionalization of the diblock macromonomer obtained, determined as in Example 5, is 59%.

We claim:

1. Functionalized multiblock macromonomer of the formula:

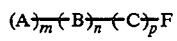 (I)

or of formula:

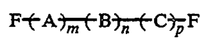 (II)

in which formulae:

each of the blocks A, B and C represents a sequence of a monomer selected from the acrylic, and methacrylic monomer classes, on condition that at least one of the blocks A and C is chosen from a different class to that of block B, m, n and p are integers representing the number of monomer units in the sequence under consideration, such that $3 \leqq n \leqq 1000$, $0 \leqq m \leqq 1000$ and $0 \leqq p \leqq 1000$, on condition that m and p are not 0 at the same time, and F is a group terminated by $O^-$.

2. Functionalized-multiblock macromonomer according to claim 1, wherein multiblock polymer $(A)_m(B)_n(C)_p$ has a number-average molecular weight ranging from 5000 to 300,000 and/or a polydispersity of the molecular weights ranging from 1.05 to 2.0.

3. Process for the production of a functionalized multiblock macromonomer of the formula:

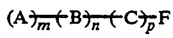 (I)

in which formula:

each of the blocks A, B and C represents a sequence of a monomer selected from the acrylic and methacrylic monomer classes, on condition that at least one of the blocks A and C is chosen from a different class to that of block B, m, n and p are integers representing the number of monomer units in the sequence under consideration, such that $3 \leqq n \leqq 1000$, $0 \leqq m \leqq 1000$ and $0 \leqq p \leqq 1000$, on condition that m and p are not 0 at the same time, and F is a group terminated by $O^-$, said process comprising:

(1) an anionic polymerization of at least one monomer A is carried out with the aid of an initiator system consisting of at least one monofunctional initiator and at least one ligand selected from alkali metal salts, alkaline earth metal salts and macrocyclic complexing agents which do not contain nitrogen, to obtain a living chain of the polymer sequence $(A)_m^-$; then (2) the living chain thus obtained is reacted with at least one monomer B, in the presence of at least one ligand as defined above, to obtain a living diblock copolymer $(A)_m(B)_n^-$; then (3) optionally, the living diblock copolymer thus obtained is reacted with at least one monomer C, in the presence of at least one ligand as defined above, to obtain a living triblock copolymer $(A)_m—(B)_n—(C)_p^-$; then (4) the living block polymer obtained in step (2) or in step (3) is reacted with a functionalizing agent in order to obtain a multiblock macromonomer having a terminal $O^-$.

4. Production process according to claim 3 wherein in a step (5) the macromonomer is reacted with a second functionalizing agent in order to obtain a multiblock macromonomer having a terminal hydroxyl or vinyl.

5. Production process according to claim 4, wherein a multiblock macromonomer having a terminal vinyl is obtained in step (5), and in a step (6) the macromonomer is subjected to a transesterification of its acrylic groups or to a hydrolysis.

6. Process for the production of a functionalized multiblock macromonomer of the formula:

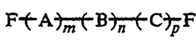 (II)

in which formula:

each of the blocks A, B and C represents a sequence of a monomer selected from the acrylic and methacrylic monomer classes, on condition that at least one of the blocks A and C is chosen from a different class to that of block B, m, n and p are integers representing the number of monomer units in the sequence under consideration, such that $3 \leqq n \leqq 1000$, $0 \leqq m \leqq 1000$ and $0 \leqq p \leqq 1000$, on condition that m and p are not 0 at the same time, and F is a group terminated by $O^-$, said process comprising:

(1) the anionic polymerization of at least one monomer B is carried out with the aid of an initiator system consisting of at least one difunctional initiator and at least one ligand selected from alkali metal salts, alkaline earth metal salts and macrocyclic complexing agents which do not contain nitrogen, to obtain a living chain of the polymer sequence $(B)_n^-$; then (2) the living chain thus obtained is reacted with at least one monomer A, in the presence of at least one ligand as defined above, to obtain a living triblock copolymer $(A)_m(B)_n(C)_p^-$; then (3) the living triblock copolymer thus obtained is reacted with at least one functionalizing agent in order to obtain a triblock macromonomer having a terminal $O^-$.

7. Production process according to claim 6, wherein the triblock macromonomer obtained in step (3) having a terminal $O^-$, is reacted with a second functionalizing agent in order to obtain a triblock macromonomer having at least one terminal hydroxyl or vinyl.

8. Production process according to claim 7, wherein the triblock macromonomer obtained in step (3) or (4) has a terminal vinyl, and in a step (5), the macromonomer is subjected to a transesterification of its acrylic groups or to a hydrolysis.

9. Production process according to claim 3 or claim 6, wherein the functionalizing agent is chosen from aldehydes of formula:

$$R_1-C(=O)H$$

in which $R_1$ represents an aromatic hydrocarbon group.

10. Production process according to claim 9 wherein the functionalizing agent is selected from the group consisting of benzaldehyde and anthracenyl aldehyde.

11. Production process according to claim 5, wherein the macromonomer is further subjected to saponification.

12. Production process according to claim 8, wherein the macromonomer is further subjected to saponification.

13. Production process according to claims 4 or 7, wherein the second functionalizing agent is methacryloyl chloride or acryloyl chloride.

* * * * *

UNITED STATES PATENT AND TRADEMARK OFFICE
CERTIFICATE OF CORRECTION

PATENT NO. : 5,391,628

DATED : February 21, 1995

INVENTOR(S) : Patrice GAILLARD et al.

It is certified that error appears in the above-identified patent and that said Letters Patent is hereby corrected as shown below:

On the title page

Item, [22] PCT Filed: "Feb. 14, 1991" should read --Feb. 12, 1991--.

Signed and Sealed this

Sixth Day of June, 1995

*Attest:*

BRUCE LEHMAN

*Attesting Officer*

*Commissioner of Patents and Trademarks*